(12) United States Patent
Harper (10) Patent No.: US 12,155,448 B2
(45) Date of Patent: Nov. 26, 2024

(54) CHANGING AN ANTENNA PATTERN

(71) Applicant: Microsoft Technology Licensing, LLC, Redmond, WA (US)

(72) Inventor: Marc Harper, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/349,666

(22) Filed: Jun. 16, 2021

(65) Prior Publication Data

US 2022/0407586 A1 Dec. 22, 2022

(51) Int. Cl.
*H04B 7/08* (2006.01)
*H01Q 3/24* (2006.01)
*H04B 17/318* (2015.01)

(52) U.S. Cl.
CPC ............ *H04B 7/0871* (2013.01); *H01Q 3/24* (2013.01); *H04B 17/318* (2015.01)

(58) Field of Classification Search
CPC .................................................. H04B 7/0871
See application file for complete search history.

(56) References Cited

U.S. PATENT DOCUMENTS

| | | | |
|---|---|---|---|
| 8,217,843 B2 | 7/2012 | Shtrom et al. | |
| 8,957,827 B1* | 2/2015 | Lee | H01Q 5/378 343/702 |
| 9,190,726 B2 | 11/2015 | Montgomery et al. | |
| 9,293,828 B2 | 3/2016 | Bevelacqua et al. | |
| 9,661,426 B2 | 5/2017 | Ozden | |
| 10,411,352 B2 | 9/2019 | Liu et al. | |
| 2004/0192222 A1* | 9/2004 | Vaisanen | H04B 1/3805 455/73 |
| 2005/0064824 A1* | 3/2005 | Bergervoet | H04B 7/0602 455/101 |
| 2006/0050000 A1 | 3/2006 | Hirabayashi | |
| 2010/0149067 A1 | 6/2010 | Williams et al. | |
| 2013/0307753 A1* | 11/2013 | Andrenko | H01Q 1/243 343/904 |
| 2013/0310045 A1* | 11/2013 | Yan | H04B 7/0404 455/437 |
| 2015/0016645 A1 | 1/2015 | Bauman et al. | |

(Continued)

FOREIGN PATENT DOCUMENTS

| | | |
|---|---|---|
| CN | 106129613 A | 11/2016 |
| EP | 2458675 A2 | 5/2012 |

OTHER PUBLICATIONS

Barousis, et al., "Reconfigurable Parasitic Antennas for Compact Mobile Terminals in Multiuser Wireless Systems", In EURASIP Journal on Wireless Communications and Networking, vol. 2012, Issue 1, Feb. 3, 2012, 10 Pages.

(Continued)

Primary Examiner — Hsinchun Liao
(74) *Attorney, Agent, or Firm* — Alleman Hall & Tuttle LLP (57) ABSTRACT

Examples are disclosed that relate to changing an antenna pattern via one or more configurable parasitic antennas. One example provides a wireless device comprising a radio, a driven antenna connected to the radio, a ground plane, and one or more parasitic antennas. Each parasitic antenna connects to the ground plane via a switch operable to change an antenna pattern of the driven antenna.

20 Claims, 8 Drawing Sheets

(56) References Cited

U.S. PATENT DOCUMENTS

| | | | |
|---|---|---|---|
| 2015/0147980 A1* | 5/2015 | Larsen .................. | H01Q 9/0421 |
| | | | 343/745 |
| 2017/0207524 A1* | 7/2017 | Cardinali ............... | H05K 3/284 |
| 2019/0289411 A1 | 9/2019 | Thaysen | |

OTHER PUBLICATIONS

"International Search Report & Written Opinion issued in PCT Application No. PCT/US22/028880", Mailed Date : Aug. 25, 2022, 14 Pages.

Mowler, Marc et al., "Switched MEMS Antenna for Handheld Devices", Signal Processing Lab, School of Electrical Engineering, KTH, Stockholm, Sweden, Jan. 2008, 9 pages.

* cited by examiner

CHANGING AN ANTENNA PATTERN

BACKGROUND

A mobile device may comprise an antenna configured for wireless connectivity, such as Bluetooth or Wi-Fi connectivity. The antenna can be characterized by an antenna pattern, or radiation pattern, in three-dimensional space that relates to a performance of the antenna as a function of direction.

SUMMARY

Examples are disclosed that relate to changing an antenna pattern via one or more switchable parasitic antennas. One example provides a wireless device comprising a radio, a driven antenna connected to the radio, a ground plane, and one or more parasitic antennas. Each parasitic antenna connects to the ground plane via a corresponding switch operable to change an antenna pattern of the driven antenna.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a mobile device may include an antenna for wireless connectivity. Mobile devices may take various different forms. Some, such as laptop computers and smart phones, are configured for carrying, while others, such as an earbud configured to connect to a phone, are configured to be worn.

Performance of an antenna may be impacted by an environment surrounding the mobile device. For example, placement of an earbud in an ear can impact a performance of an antenna of the earbud, as the body can interfere with the antenna. This is sometimes called the "body effect." In some instances, the body effect may cause an omnidirectional antenna on the earbud to no longer have an omnidirectional antenna pattern, potentially reducing antenna performance in some directions, and thereby impacting throughput of data on a wireless connection. As a result, audio may be transmitted to the earbud unreliably, which can impact experiences such as listening to music or participating in a conference call.

Increasing a power of the antenna may help to reduce the risk of reduced data throughput based upon environmental conditions. However, as mobile devices are often battery powered, increasing the power of the antenna may cause faster consumption of battery charge.

Accordingly, examples are disclosed related to a wireless device comprising a driven antenna and one or more parasitic antennas configured to adjust an antenna pattern of the driven antenna. Briefly, the one or more parasitic antennas are connected to a ground plane of the device via one or more switches that are each operable to change the antenna pattern, and thus change a directional performance of the driven antenna without the complexity of driving separate switchable driven antennas. Further, a controller compares a measure of signal strength of a first switch configuration to a threshold value. When the signal strength is less than the threshold value, the controller changes a state of a switch to put the switches in a second switch configuration and thereby change the antenna pattern. When the second switch configuration has a signal strength higher than the first switch configuration, the controller switches to the second switch configuration for wireless communication. Additional switch configurations may also be tested to select a switch configuration with a suitable received signal strength.

Figure 1:
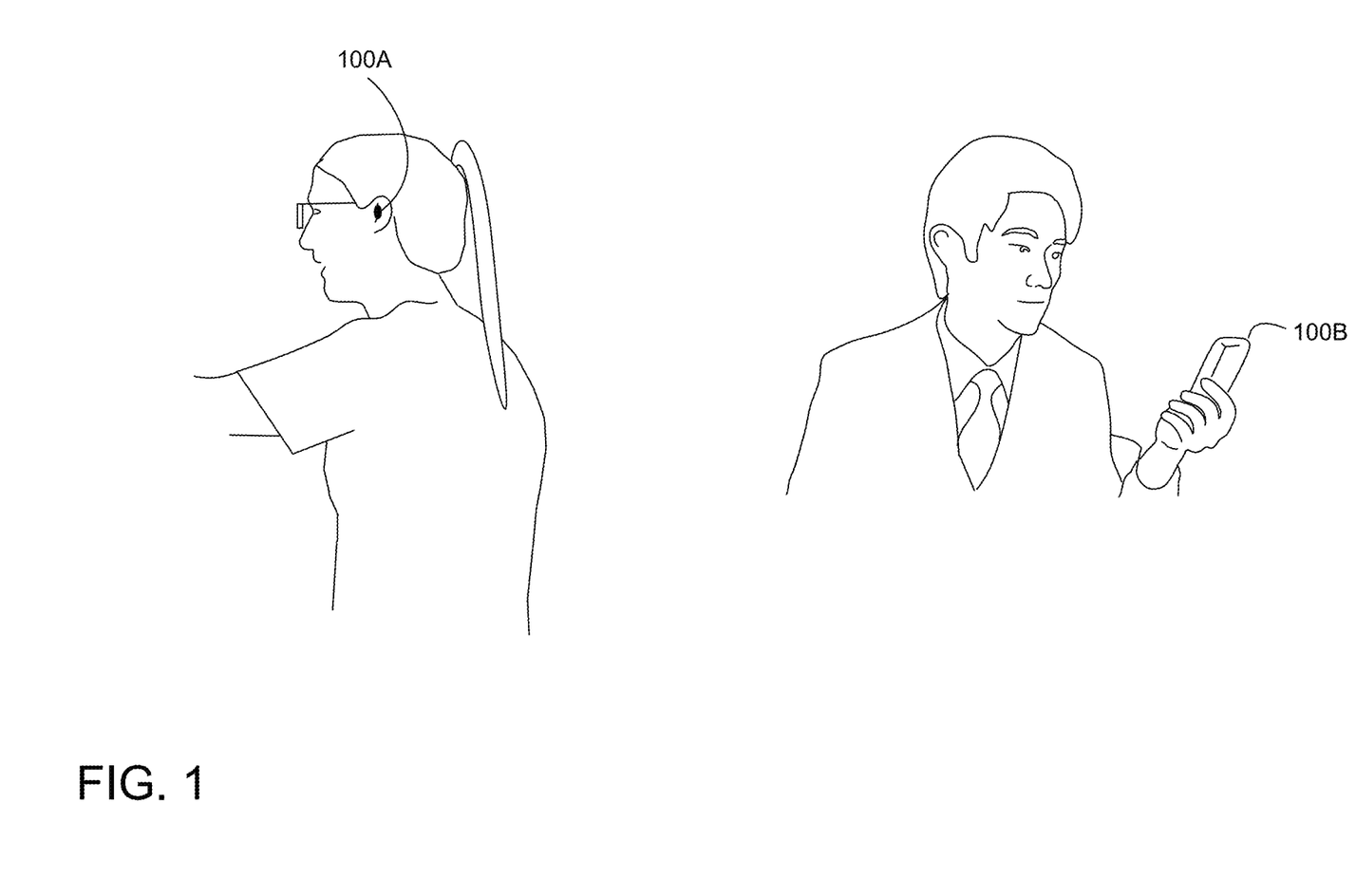
FIG. 1 shows examples of wireless devices.

FIG. 1 shows example wireless devices that may comprise configurable parasitic antennas. Wireless device 100A comprises an earbud, and may connect to a host device, such as a phone or a tablet, via wireless communication. Wireless device 100B comprises a smartphone, and may connect wirelessly to another device, such as another smartphone or a wireless router. In various examples, the wireless communication may utilize a Bluetooth connection, a Wi-Fi connection, or any other suitable connection. Wireless device 100A and wireless device 100B are shown as illustrative examples, and a wireless device may take any other suitable form in other examples, such as a laptop computer, tablet device, head-mounted display device, or wrist worn device.

Figure 2:
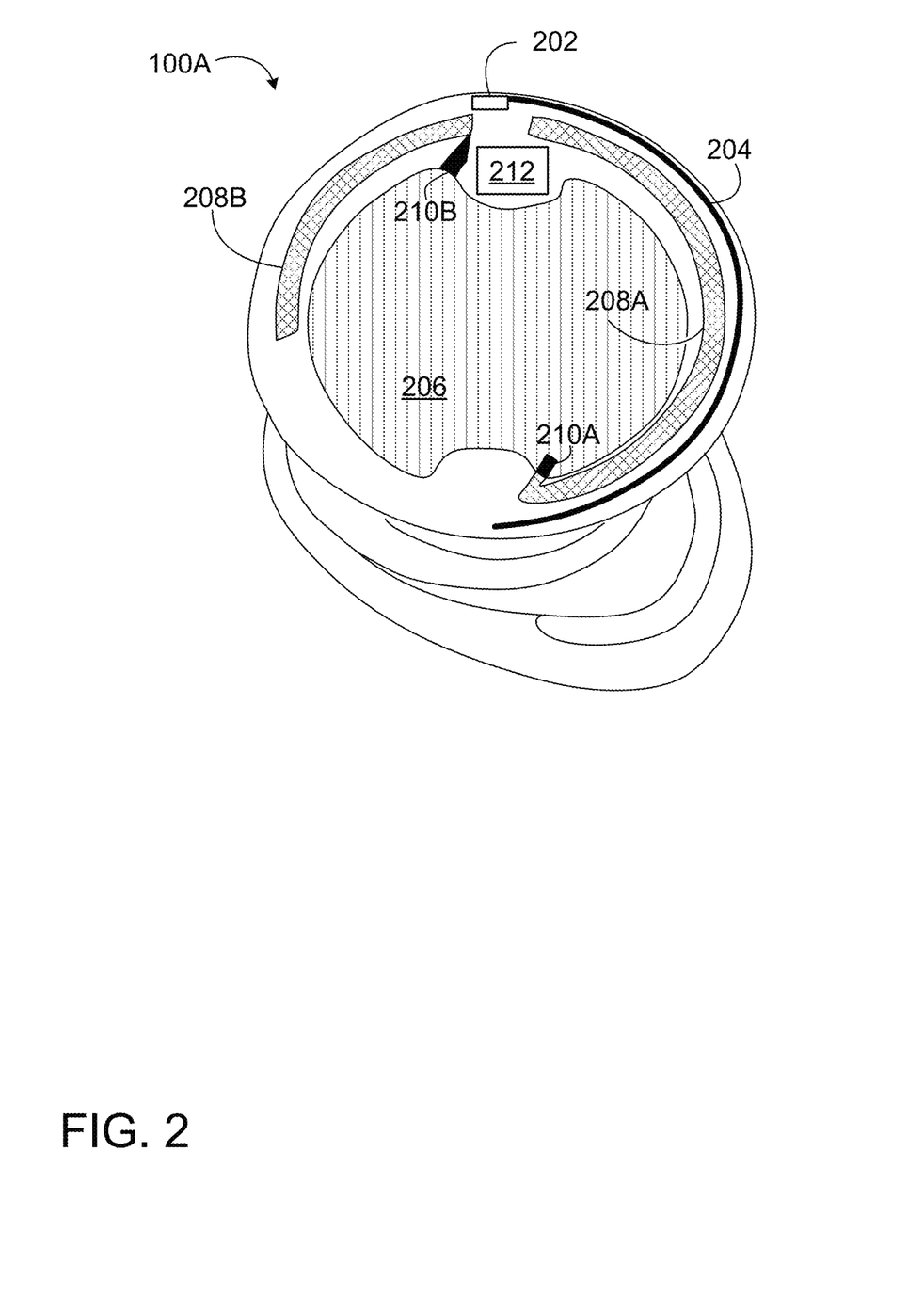
FIG. 2 shows an example wireless device in the form of an earbud, and illustrates an example driven antenna and two example parasitic antennas.

FIG. 2 shows example wireless device 100A in more detail. Wireless device 100A comprises a radio 202 and a driven antenna 204 connected to the radio 202. The driven antenna 204 is configured to connect wirelessly to a host device. In some examples the driven antenna 204 may comprise a monopole antenna. In other examples the driven antenna 204 may comprise a slot antenna formed in a chassis, a dipole antenna, or any other suitable type of antenna. The use of a slot antenna formed in a device chassis may provide a space-efficient antenna implementation. The radio 202 may comprise a Bluetooth driver, a Wi-Fi driver, and/or any other suitable antenna driver.

Wireless device 100A further comprises a ground plane 206, a first parasitic antenna 208A connected to the ground plane 206 via a corresponding first switch 210A, and a second parasitic antenna 208B connected to the ground plane 206 via a corresponding second switch 210B. Driven antenna 204 may induce electrical currents on the ground plane 206. First switch 210A and second switch 210B are configured to be controllable via a controller 212. When first switch 210A is in a first state (e.g. a closed state), electrical currents on the ground plane 206 flow through first parasitic antenna 208A. Likewise, when first switch 210A is in a second state (e.g. an open state), the electrical currents on the ground plane 206 do not flow through first parasitic antenna 208A. Similarly, second switch 210B is used to control current flow through second parasitic antenna 208B.

The change in flow of the current between switch configurations changes an antenna pattern of the driven antenna 204. The term "switch configuration" is used herein to describe the collective states of switches between one or more parasitic antennas and a ground plane. In some examples, the ground plane 206 may be arranged on a printed circuit board (PCB), while in other examples the ground plane may have any other suitable arrangement.

Figure 3:
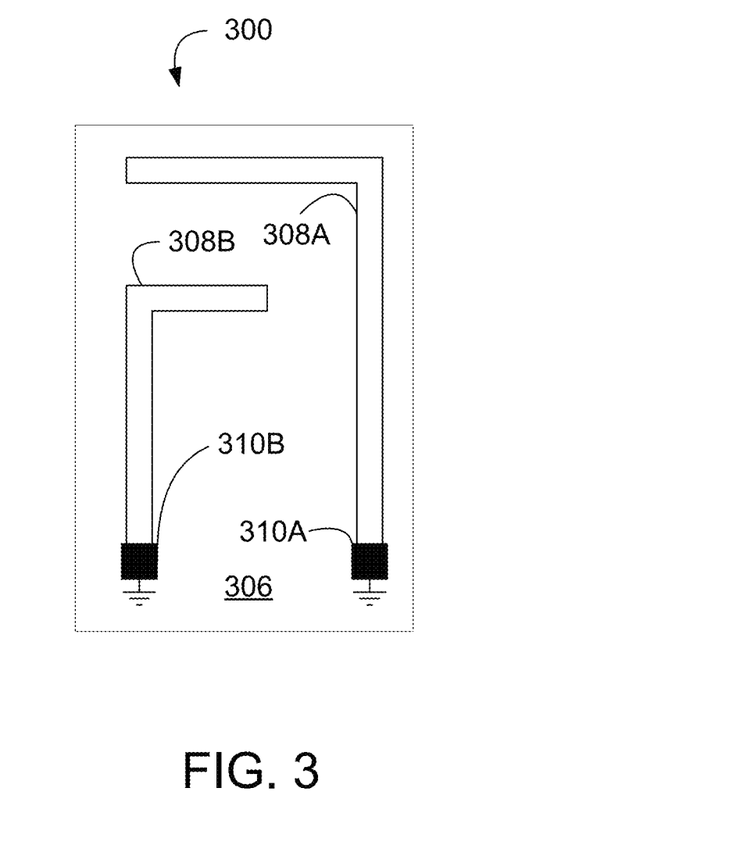
FIG. 3 shows a schematic diagram of example parasitic antennas for a driven antenna.

A wireless device may include any suitable number of parasitic antennas and switches to provide for any suitable number of different switch configurations for a driven antenna. For example, wireless device 100A comprises two parasitic antennas each having a single corresponding switch to change the antenna pattern of a driven antenna. FIG. 3 schematically shows an example parasitic antenna and switch arrangement 300. Device 100A is an example implementation of arrangement 300. Arrangement 300 comprises a first parasitic antenna 308A connected to a ground plane 306 via a corresponding first switch 310A located at an end of the first antenna, and a second parasitic antenna 308B connected to the ground plane via a corresponding second switch 310B located at an end of the second antenna. Arrangement 300 provides for four possible switch configurations: both switches closed, both switches open, the first switch open and the second switch closed, and the second switch open and the first switch closed. A corresponding driven antenna is omitted from FIG. 3 for clarity. Other devices may have any other suitable number of switches, number of parasitic antennas, and/or arrangement of parasitic antennas and switches for a driven antenna, including two or more switches for a parasitic antenna, as will be discussed in more detail later.

Figure 4:
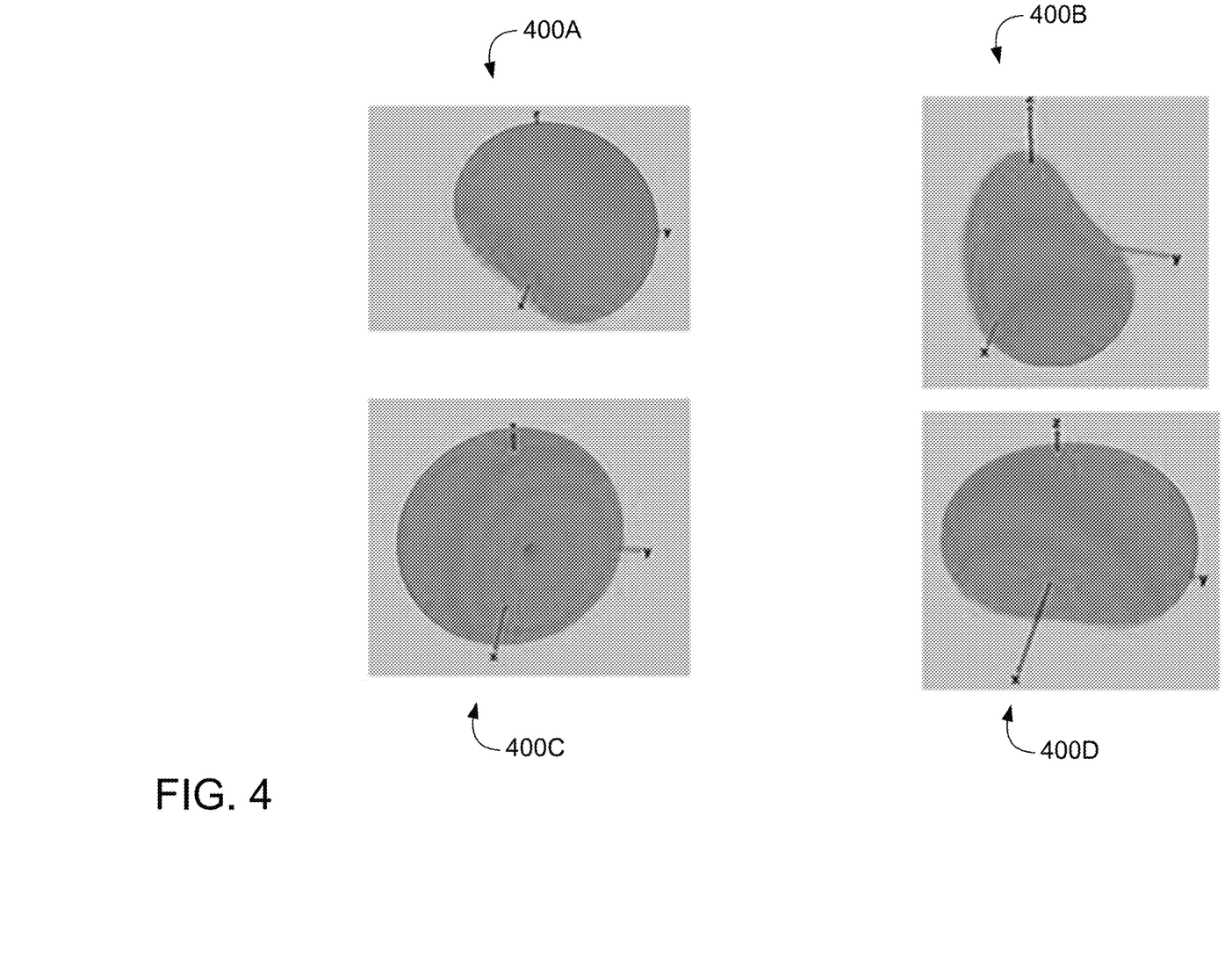
FIG. 4 shows example antenna patterns corresponding to different switch configurations of the parasitic antennas of FIG. 3.

FIG. 4 shows example simulated antenna patterns 400A-D for wireless device 100A. As discussed previously, wireless device 100A comprises two corresponding switches each with a first state (e.g. closed state) and a second state (e.g. open state), resulting in four switch configurations of the parasitic antennas and the corresponding switches, and therefore four different antenna patterns. Antenna pattern 400A corresponds to a switch configuration in which both switches are in an open state, and has a first associated directional performance. Antenna pattern 400B corresponds to a switch configuration in which the first switch is in a closed state and the second switch is in the open state, and has a second associated directional performance. Antenna pattern 400C corresponds to a switch configuration in which the first switch is in the open state and the second switch is in the closed state, and has a third associated directional performance. Antenna pattern 400D corresponds to both switches being in the closed state, and has a fourth associated directional performance.

Depending on the relative location of a host device to a wireless device, one antenna pattern may have a higher signal strength than a different antenna pattern. Thus, a wireless device can select a switch configuration, and therefore an antenna pattern, based at least in part on measuring a received signal strength for two or more switch configurations and selecting a switch configuration with a higher received signal strength.

Figure 5:
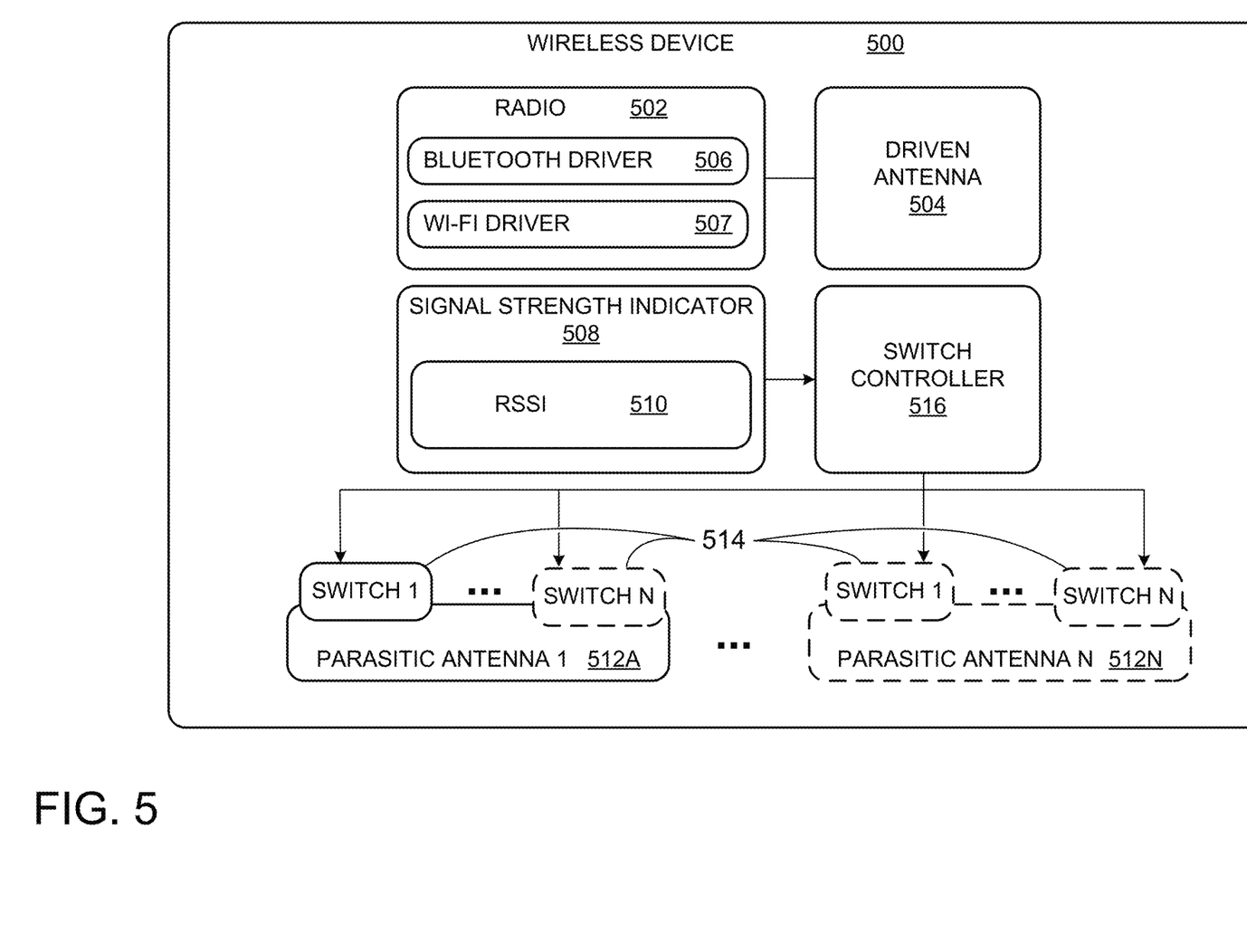
FIG. 5 shows a block diagram of an example wireless device.

A wireless device may measure a received signal strength in any suitable manner. FIG. 5 shows a block diagram of an example wireless device 500 comprising a radio 502, a driven antenna 504 connected to the radio 502, and a signal strength indicator 508. Wireless device 100A and wireless device 100B are examples of wireless device 500. The radio 502 may comprise a Bluetooth driver 506, a Wi-Fi driver 507, and/or any suitable wireless diver. The signal strength indicator 508 is configured to determine a signal strength of a received signal. In some examples, the signal strength indicator 508 may comprise a received signal strength indicator (RSSI) 510, which is a relative value provided by a radio receiver, and may vary between different communication chip manufacturers. In other examples, a power meter may be included to determine a received signal power level quantitatively.

Wireless device 500 further comprises one or more parasitic antennas 512, indicated by parasitic antenna 512A and optional parasitic 512N, indicating the N−1 additional parasitic antennas. Each parasitic antenna 512 is connected to a ground plane (not shown) via one or more corresponding switches 514, as described previously. Each corresponding switch 514 is configured to have one or more states. A controller 516 is configured to select a switch configuration of the corresponding switches based at least in part on a determined signal strength of a received signal for the switch configuration.

Figure 6:
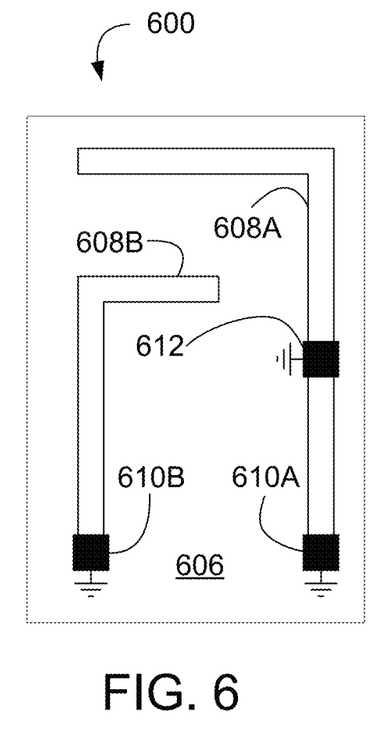
FIGS. 6-8 show schematic diagrams of other example arrangements of parasitic antennas for a driven antenna.

The examples of FIGS. 2 and 3 comprise two parasitic antennas and two corresponding switches (one for each parasitic antenna) to control a pattern of a driven antenna. In other examples, a wireless device may have any other suitable arrangements of switches and parasitic antennas for a driven antenna. FIG. 6 schematically shows another example arrangement 600 of parasitic antennas and switches for a driven antenna (not shown) of a wireless device. Arrangement 600 comprises a first parasitic antenna 608A connected to a ground plane 606 via a first switch 610A that is located at an endpoint of the antenna, and a second switch 612 that is located at a midpoint of the antenna. Switch 612 may control a different current flow through first parasitic antenna 608A than switch 610A as switch 612 is located at a different location on first parasitic antenna 608A than switch 610A. Arrangement 600 further comprises a second parasitic antenna 608B connected to the ground plane 606 via a switch 610B. As mentioned previously, a change in a pattern of current flow through one or more parasitic antennas and the ground plane may result in a change in an antenna pattern of a driven antenna. While the arrangements of FIGS. 2, 3 and 6 each have two parasitic antennas for one driven antenna, other examples may have any other suitable number of parasitic antennas for a driven antenna.

Figure 7:
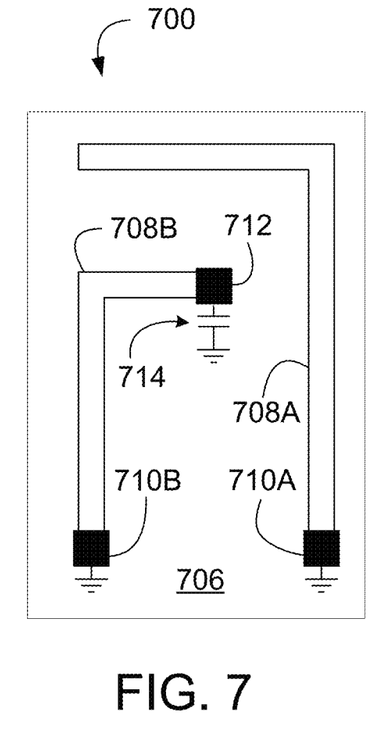

In the examples described above, each switch is configured to connect a parasitic antenna directly to a ground plane. In other examples, a connection between a parasitic antenna and a ground plane may comprise a reactive element. For example, FIG. 7 shows an example arrangement 700 comprising a first parasitic antenna 708A connected to a ground plane 706 via a first switch 710A, and a second parasitic antenna 708B connected to the ground plan 706 via a second switch 710B. Second parasitic antenna 708B is further connected to the ground plane 706 via another switch 712 and capacitor 714. Capacitor 714 changes how the current flows through switch 712 and therefore the second parasitic antenna 708B and the ground plane 706 when switch 712 is in a closed configuration.

Figure 8:
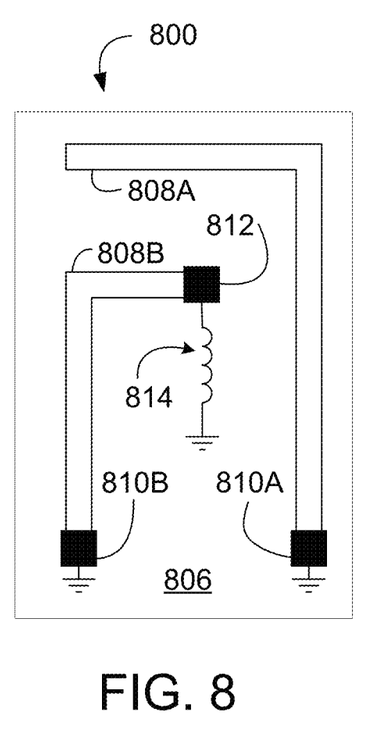

FIG. 8 shows another example parasitic antenna and switch arrangement 800 comprising a first parasitic antenna 808A connected to a ground plane 806 via a switch 810A and a second parasitic antenna 808B connected to the ground plane 806 via a switch 810B. Second parasitic antenna 808B is further connected to the ground plane 806 via a switch 812 and an inductor 814, in addition to switch 810B. Inductor 814 can change a current flow on the ground plane 806 and thus an antenna pattern of a driven antenna, as previously mentioned. In further examples, a wireless device may comprise any other suitable arrangement of parasitic antennas connected to a ground plane via any suitable number and arrangement of switches, located at any suitable location(s) along the antenna, and wherein each switched connection to the ground plane may be direct or may include one or more other circuit elements, such as reactive elements.

Figure 9:
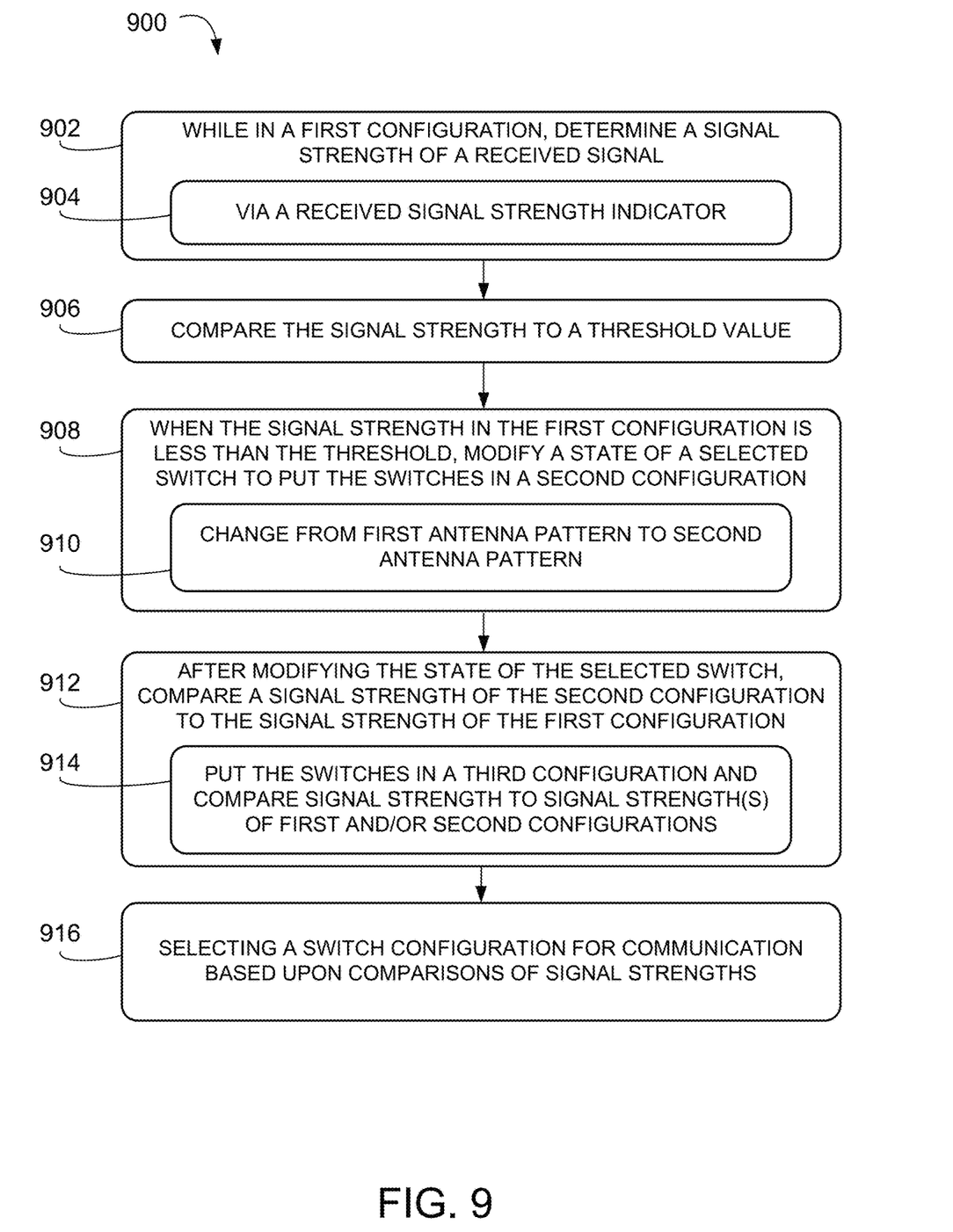
FIG. 9 shows a flow diagram of an example method for controlling an antenna pattern.

FIG. 9 shows a flow diagram illustrating an example method 900 for controlling an antenna pattern of a driven antenna on a wireless device via one or more parasitic antennas connected to a ground plane via one or more corresponding switches. Method 900 may be performed on any suitable wireless device, such as those shown and described herein. Method 900 comprises, at 902, while in a first switch configuration on the wireless device, determining a signal strength of a received signal. As mentioned above, a switch configuration comprises a collective state of one or more switches that each connects a parasitic antenna to a ground plane, either directly or through circuit elements such as reactive elements. In some examples, determining the signal strength may be performed via obtaining a received signal strength indicator (RSSI), at 904. In other examples, any suitable sensor may be used to determine a received signal strength. Method 900 further comprises, at 906, comparing the signal strength of the received signal to a threshold value. Any suitable threshold value may be used. When the signal strength of the received signal in the first switch configuration is less than the threshold value, method 900 comprises modifying a state of a selected corresponding switch on the device to put the corresponding switches in a second switch configuration, at 908, to thereby change from an antenna pattern associated with the first switch configuration to an antenna pattern associated with the second switch configuration, at 910.

Method 900 further comprises, at 912, comparing a signal strength in the second switch configuration to the signal strength of the first switch configuration. In examples that comprise two or more switches, method 900 may further comprise, at 914, putting the switches in a third switch configuration by modifying a state of another selected switch, and comparing the signal strength of the third switch configuration to the signal strength(s) of the first and/or second switch configurations. Method 900 further may comprise determining and comparing signal strength(s) for any additional switch configuration(s), depending upon how many parasitic antenna switch configurations the wireless device supports for a driven antenna.

Continuing, method 900 comprises selecting a switch configuration for wireless communication based upon the comparisons of the different switch configurations. In some examples, a switch configuration determined to provide a highest signal strength may be selected. In other examples, any other suitable switch configuration may be selected. As a more specific example, when the signal strength of the second switch configuration is greater than the signal strength of the first switch configuration, the second switch configuration can be selected for wireless communication, at 916, and may support a higher data throughput than the first switch configuration with a lower signal strength.

In some examples, the methods and processes described herein may be tied to a computing system of one or more computing devices. In particular, such methods and processes may be implemented as a computer-application program or service, an application-programming interface (API), a library, and/or other computer-program product.

Figure 10:
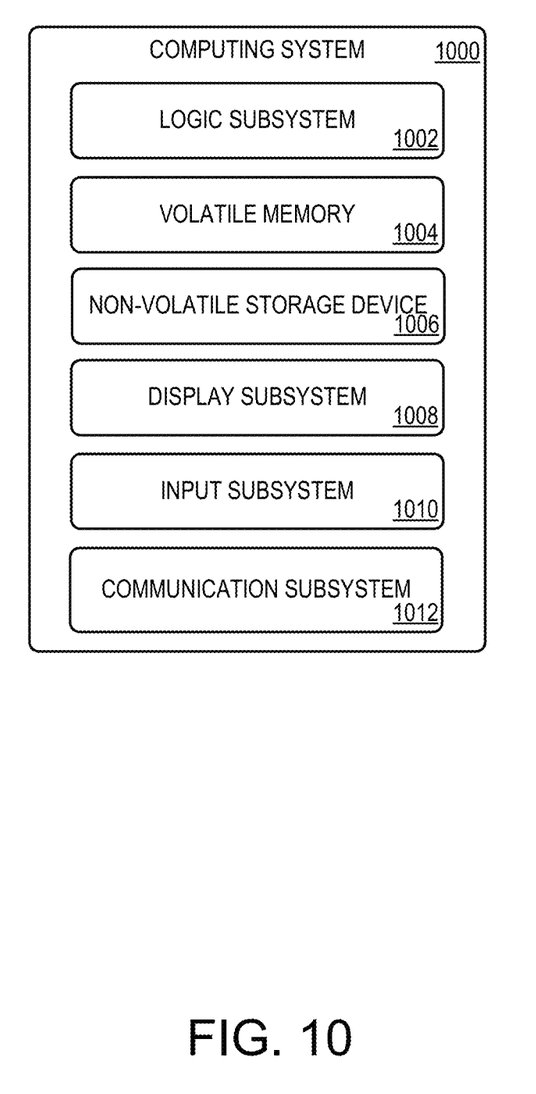
FIG. 10 shows an example computing system.

FIG. 10 schematically shows a non-limiting embodiment of a computing system 1000 that can enact one or more of the methods and processes described above. Computing system 1000 is shown in simplified form. Computing system 1000 may embody the wireless device 100 described above and illustrated in FIG. 1. Computing system 1000 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1000 includes a logic subsystem 1002, volatile memory 1004, and a non-volatile storage device 1006. Computing system 1000 may optionally include a display subsystem 1008, input subsystem 1010, communication subsystem 1012, and/or other components not shown in FIG. 10.

Logic subsystem 1002 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic subsystem 1002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 may be transformed—e.g., to hold different data.

Non-volatile storage device 1006 may include physical devices that are removable and/or built-in. Non-volatile storage device 1006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by logic subsystem 1002 to temporarily store information during processing of software instructions. It will be appreciated that volatile memory 1004 typically does not continue to store instructions when power is cut to the volatile memory 1004.

Aspects of logic subsystem 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1008 may be used to present a visual representation of data held by non-volatile storage device 1006. The visual representation may take the form of a graphical user interface (GUI). As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with logic subsystem 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1012 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1000 to send and/or receive messages to and/or from other devices via a network such as the Internet.

One example provides a wireless device comprising a radio, a driven antenna connected to the radio, a ground plane, and one or more parasitic antennas each connected to the ground plane via a corresponding switch operable to change an antenna pattern of the driven antenna. In some examples, for a selected parasitic antenna, a selected corresponding switch is alternatively or additionally located at an end point of the selected parasitic antenna. In some examples, for a selected parasitic antenna, a selected corresponding switch is alternatively or additionally located at a mid-way point of the selected parasitic antenna. In some examples, the ground plane is alternatively or additionally arranged on a printed circuit board (PCB). In some examples, the radio alternatively or additionally comprises a Bluetooth driver. In some examples, the driven antenna alternatively or additionally comprises a slot antenna formed in a part of a chassis of the device. In some examples, the driven antenna alternatively or additionally comprises a monopole antenna. In some examples, the one or more parasitic antennas are alternatively or additionally each further connected to the ground plane via one or more of a capacitor and an inductor in series with a selected corresponding switch.

Another example provides, on a wireless device comprising a driven antenna and one or more parasitic antennas each configurable via a corresponding switch of one or more switches, a method of operating the wireless device. The method comprising while the one or more switches are in a first switch configuration, determining a signal strength of a received signal in the first switch configuration, comparing the signal strength to a threshold value, when the signal strength of the received signal in the first switch configuration is less than the threshold value, modifying a state of a selected switch of the one or more switches to put the one or more switches in a second switch configuration, after modifying the state of the selected switch, determining a signal strength in the second switch configuration, and when the signal strength in the second switch configuration is greater than the signal strength in the first switch configuration, using the second switch configuration for communication. In some examples, determining the signal strength alternatively or additionally comprises obtaining a received signal strength indicator (RSSI). In some examples, the device is alternatively or additionally configured to be worn at least partially inside an ear. In some examples, the one or more switches of the one or more parasitic antennas alternatively or additionally comprises a third switch configuration. In some examples, the method alternatively or additionally comprises determining a signal strength in a third switch configuration.

Another example provides a wireless earbud device comprising a radio, a driven antenna connected to the radio, a ground plane, and one or more parasitic antennas each connected to the ground plane via a corresponding switch. In some examples, for a selected parasitic antenna, a selected corresponding switch of the one or more corresponding switches is alternatively or additionally located at an end of the selected parasitic antenna. In some examples, for a selected parasitic antenna, a selected corresponding switch of the one or more corresponding switches is alternatively or additionally located along a length of the selected parasitic antenna. In some examples, the ground plane is alternatively or additionally arranged on a printed circuit board (PCB). In some examples, the radio alternatively or additionally comprises a Bluetooth driver. In some examples, the driven antenna alternatively or additionally comprises a monopole antenna. In some examples, the one or more parasitic antennas are alternatively or additionally connected to the ground plane via one or more of a capacitor and an inductor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wireless device comprising:
   a radio;
   a driven antenna connected to the radio;
   a ground plane;
   one or more parasitic antennas each connected to a corresponding switch of a corresponding one or more switches, each corresponding switch being further connected to the ground plane and operable to change an antenna pattern of the driven antenna; and
   a controller configured to modify a state of a selected corresponding switch of the corresponding one or more switches to put the corresponding one or more switches in a different switch configuration based on a signal strength of a received signal.

2. The device of claim 1, wherein, for a selected parasitic antenna, the selected corresponding switch is located at an end point of the selected parasitic antenna.

3. The device of claim 1, wherein, for a selected parasitic antenna, the selected corresponding switch is located at a mid-way point of the selected parasitic antenna.

4. The device of claim 1, wherein the ground plane is arranged on a printed circuit board (PCB).

5. The device of claim 1, wherein the radio comprises a Bluetooth driver.

6. The device of claim 1, wherein the driven antenna comprises a slot antenna formed in a part of a chassis of the device.

7. The device of claim 1, wherein the driven antenna comprises a monopole antenna.

8. The device of claim 1, wherein the one or more parasitic antennas are each further connected to the ground plane via one or more of a capacitor and an inductor in series with the selected corresponding switch.

9. On a wireless device comprising a driven antenna and one or more parasitic antennas each configurable via a corresponding switch of one or more switches, a method of operating the wireless device, the method comprising:
   while the one or more switches are in a first switch configuration, determining a signal strength of a received signal in the first switch configuration;
   comparing the signal strength to a threshold value;
   when the signal strength of the received signal in the first switch configuration is less than the threshold value, modifying a state of a selected switch of the one or more switches to put the one or more switches in a second switch configuration;
   after modifying the state of the selected switch, determining a signal strength in the second switch configuration; and
   when the signal strength in the second switch configuration is greater than the signal strength in the first switch configuration, using the second switch configuration for communication.

10. The method of claim 9, wherein determining the signal strength comprises obtaining a received signal strength indicator (RSSI).

11. The method of claim 9, wherein the device is configured to be worn at least partially inside an ear.

12. The method of claim 9, wherein the one or more switches of the one or more parasitic antennas further comprises a third switch configuration.

13. The method of claim 12, further comprising determining a signal strength in the third switch configuration.

14. A wireless earbud device comprising:
   a radio;
   a driven antenna connected to the radio;
   a ground plane;
   one or more parasitic antennas each connected to a corresponding switch of a corresponding one or more switches, each corresponding switch being further connected to the ground plane; and
   a controller configured to modify a state of a selected corresponding switch of the corresponding one or more switches to put the corresponding one or more switches in a different switch configuration based on a signal strength of a received signal.

15. The device of claim 14, wherein, for a selected parasitic antenna, the selected corresponding switch of the one or more corresponding switches is located at an end of the selected parasitic antenna.

16. The device of claim 14, wherein, for a selected parasitic antenna, the selected corresponding switch of the one or more corresponding switches is located along a length of the selected parasitic antenna.

17. The device of claim 14, wherein the ground plane is arranged on a printed circuit board (PCB).

18. The device of claim 14, wherein the radio comprises a Bluetooth driver.

19. The device of claim 14, wherein the driven antenna comprises a monopole antenna.

20. The device of claim 14, wherein the one or more parasitic antennas are further connected to the ground plane via one or more of a capacitor and an inductor.

* * * * *